United States Patent Office 3,836,542

Patented Sept. 17, 1974

3,836,542

DERIVATIVES OF HYDROXYBENZO[b] THIOPHENE

Lester L. Maravetz, Westfield, N.J., assignor to Mobil Oil Corporation

No Drawing. Filed June 7, 1971, Ser. No. 150,850
Int. Cl. C07d 63/22
U.S. Cl. 260—330.5 17 Claims

ABSTRACT OF THE DISCLOSURE

Certain amide, acid and ester derivatives of hydroxybenzo[*b*]thiophene form a new class of herbicides. These derivatives and herbicidal compositions containing them are highly effective as both pre-emergence and post-emergence herbicides. They are highly effective against Crabgrass and Barnyard grass, annual grass weeds which reproduce by seed, and Johnson grass, a perennial grass weed which reproduces by seed and underground rhizomes. Selected compounds of this invention also show selective activity in favor of certain important crops in pre-emergent applications.

CROSS-REFERENCE TO RELATED APPLICATIONS

None.

BACKGROUND OF THE INVENTION

Field of the Invention

This invention is directed to the new compounds of amide, acid and ester derivatives of hydroxybenzo[*b*]thiophene and their use as pre- and post-emergence herbicides.

DESCRIPTION OF THE PRIOR ART

Amide derivatives of naphthol are disclosed in U.S. Pat. No. 3,480,671; Japan Pat. No. 7,021,304; and German Pat. No. 1,949,289.

SUMMARY OF THE INVENTION

This invention provides compounds having the structural formula:

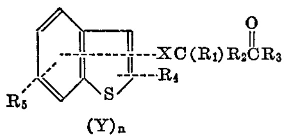

wherein X is a member selected from the group consisting of oxygen and sulfur, Y is oxygen, $R_1$ is a member selected from the group consisting of hydrogen and alkyl of 1–5 carbon atoms, $R_2$ is a member selected from the group consisting of hydrogen, alkyl of 1–3 carbon atoms, halogen (e.g., fluorine, chlorine, and bromine), and haloalkyl of 1–5 carbon atoms, $R_3$ is a member selected from the group consisting of hydroxy, alkoxy of 1–5 carbon atoms, halogen (e.g., fluorine, chlorine and bromine), $NR_6R_7$ and OM, wherein M is an organic or inorganic anion, $R_4$ and $R_5$ are members selected from the group consisting of hydrogen, alkyl of 1–5 carbon atoms, halogen (e.g., fluorine, chlorine and bromine), alkenyl of 2–6 carbon atoms, nitro, alkoxy of 1–4 carbon atoms, alkylthio of 1–5 carbon atoms, haloalkyl of 1–5 carbon atoms, dialkylamino of 2–10 carbon atoms, carboalkoxy of 2–10 atoms, alkylsulfonyl of 1–5 carbon atoms and cyano, $R_6$ and $R_7$ may be selected from the group consisting of hydrogen, alkyl of 1–5 carbon atoms, alkenyl of 2–5 carbon atoms, alkynyl of 2–5 carbon atoms, haloalkyl of 1–5 carbon atoms, haloalkenyl of 2–5 carbon atoms, alkoxyalkyl of 2–10 carbon atoms, alkylthioalkyl of 2–10 carbon atoms and cyanoalkyl of 2–6 carbon atoms and wherein $R_6$ and $R_7$ may together form an aziridinyl ring, piperidino ring, pyrrolidino ring, or a morpholino ring and wherein *n* is an integer of 0–2; use as herbicides; and hebricidally effective compositions containing at least one of the above compounds and a carrier therefor.

DESCRIPTION OF SPECIFIC EMBODIMENTS

As will be noted from the above formula, the compounds of the present invention are amide, acid and ester derivatives of hydroxybenzo[*b*]thiophene in which the 5-membered ring containing the sulfur atom is either unsaturated or saturated. Non-limiting examples of the compounds embodied by this invention include:

N,N-diethyl-2-methyl-2-(4-benzo[*b*]thienoxy)propionamide;
N,N-diethyl-2-(4-benzo[*b*]thienylmercapto)propionamide;
N,N-diethyl-2-chloro-2-(4-benzo[*b*]thienoxy)propionamide;
N,N-dimethyl-2-(4-benzo[*b*]thienoxy)valeramide;
2-(4-benzo[*b*]thienoxy)-4-chlorobutyric acid;
N,N-Bis-(2-methylthioethyl)-2-(5-benzo[*b*]thienoxy)propionamide;
N,N-Bis-(2-cyanoethyl)-2-(6-benzo[*b*]thienoxy)propionamide;
N,N-diethyl-2-(7-benzo[*b*]thienoxy)propionamide;
N,N-dipropynyl-2-(3-benzo[*b*]thienoxy)propionamide;
N,N-diallyl-2-(7-nitro-4-benzo[*b*]thienoxy)propionamide;
N,N-diethyl-2-(7-methyl-4-benzo[*b*]thienoxy)propionamide;
N,N-diethyl-2-(2,2-dimethyl-2,3-dihydro-4-benzo[*b*]thienoxy)propionamide;
N,N-diethyl-2-(2-methyl-7-chloro-4-benzo[*b*]thienoxy)propionamide;
N,N-Bis-(2-chloroethyl)-(7-allyl-4-benzo[*b*]thienoxy)acetamide;
N,N-Bis-(3-chloropropenyl-2)-(7-methoxy-4-benzo[*b*]thienoxy)acetamide;
N,N-diethyl-2-(7-methylthio-4-benzo[*b*]thienoxy)propionamide;
N-methyl-(7-chloromethyl-4-benzo[*b*]thienoxy)acetamide;
N,N-dimethyl-(7-dimethylamino-4-benzo[*b*]thienoxy)acetamide;
2-(7-carbethoxy-4-benzo[*b*]thienoxy)acetic acid;
N,N-Bis-(2-methoxyethyl)-(7-methylsulfonyl-4-benzo[*b*]thienoxy)acetamide;
N-*n*-propyl-2-(7-cyano-4-benzo[*b*]thienoxy)-propionamide;
N-[2-(4-benzo[*b*]thienoxy)propionyl]aziridine;
N-[2-(4-benzo[*b*]thienoxy)propionyl]piperidine;
N-[2-(4-benzo[*b*]thienoxy)propionyl]pyrrolidine;
N-[2-(4-benzo[*b*]thienoxy)propionyl]morpholine;
N,N-diethyl-2-(1-oxo-4-benzo[*b*]thienoxy)propionamide;
N,N-diethyl-2-(1-dioxo-4-benzo[*b*]thienoxy)propionamide;
Sodium 2-(4-benzo[*b*]thienoxy)propionate; and
2-(4-benzo[*b*]thienoxy)propionic acid dimethylamine salt.

The compounds of this invention are readily prepared by the following general method:

A typical base, non-limiting examples of which include sodium methoxide and potassium hydroxide, is added to a solution of an appropriately substituted benzothiophene, non-limiting examples of which include 4-hydroxybenzo-

[*b*]thiophene and 4-mercaptobenzo[*b*]thiophene, and a suitable solvent, non-limiting examples of which include methanol, toluene, acetonitrile, and dimethylformamide. An appropriately substituted α-haloester or α-haloamide is then added over a period of time to the solution. The total solution is then refluxed, cooled, and added to water. The insoluble non-aqueous phase is separated and combined with the extract solution obtained by extracting the aqueous phase with a suitable solvent. The combined solution is then washed and dried over a suitable drying agent, such as, for example, magnesium sulfate, and the solvent is then removed under reduced pressure to yield the product esters or amides of this invention. The corresponding acids may be obtained by heating the appropriate ester with a base such as potassium hydroxide or sodium hydroxide in a suitable solvent system (e.g., water-methanol, water-ethanol). The alcohol is removed under vacuum and to the aqueous solution is added a mineral acid (e.g., hydrochloric acid or sulfuric acid) until the organic acid product precipitates from the solution.

As an alternate route to producing the product amides of this invention, the above product acid may be reacted with such halogenation reagents as thionyl chloride or phosphorus trichloride, to give the corresponding acid chloride. The active acid chloride is then reacted with appropriate amines in such solvents as diethylether, benzene, or toluene, to give the product amides.

The general procedure was used in preparing the compounds of this invention listed as Examples 1A, 1B, 1C and 2–13, which follow. The alternate procedure for preparation of amides was used in preparing the compound listed as Example 1D, which also follows.

EXAMPLE 1

A. Methyl-2-(4-benzo[*b*]thienoxy)propionate

To a stirred solution of 4-hydroxybenzo[*b*]thiophene (30.0 g., 0.2 mole) in 230 ml. of absolute methanol was added sodium methoxide (11.9 g., 0.22 mole) all at once. The temperature rose momentarily to about 45° C. and then subsided. Ethyl-2-bromopropionate (40.0 g., 0.22 mole) was added dropwise with stirring over a period of forty minutes. The mixture was refluxed for 1½ hours, cooled, and to it was added 600 ml. of water. The bottom oily layer which formed was removed by a separatory funnel and the aqueous phase was extracted with ether (100 ml.). The ether extract and oil after combining were washed consecutively with 30–40 ml. portions of 10% HCl, saturated $NaHCO_3$ solution, and water. The ether solution after drying over $MgSO_4$ was stripped down via a rotating evaporator to yield a pale yellow oil (44.3 g.) whose spectral data was consistent with the proposed product. The methyl ester was formed through transesterification of the initial ester in the presence of $NaOCH_3$ and excess methanol.

IR: (C=O at 173 cm.$^{-1}$)
NMR: ($CDCl_3$) σ 1.65 (3H, *d*, C—$CH_3$), 3.67 (3H, *s*, $OCH_3$), 4.8 (1H, *q*, OCH), 6.55 (1H, *d*, vinyl H), 7.3 (4H, *m*, aromatic and S—CH=).

B. 2-(4-benzo[*b*]thienoxy)propionic acid

Methyl-2-(4-benzo[*b*]thienoxy)proprionate (40.0 g., 0.169 mole) was dissolved in 150 ml. of absolute ethanol. To this solution was added a solution of potassium hydroxide (10.9 g., assay 87%) in 100 ml. of water and the resulting clear mixture was refluxed for about ½ hour. Most of the methanol was removed under reduced pressure until a total volume of about 120 ml. was attained. To this residue was added 100 ml. of water and with stirring the solution was acidified with 10% HCl. The oil which formed solidified upon chilling to give, after filtration and drying, 33.2 g. of tan solids. Recrystallization from ethanol/water gave the acid as a white product with a melting point of 135–37°.

IR: (~1700 cm.$^{-1}$, C=O)
NMR: ($CDCl_3$) σ 1.70 (3H, *d*, C—$CH_3$) 4.87 (1H, *q*, OCH), 6.58 (1H, *d*, vinyl H), 7.3 (4H, *m*, aromatic and S—C<u>H</u>=), 8.82 (1H, *s*, OH).

C. 2-(4-benzo[*b*]thienoxy)propionyl chloride

A slurry of 2-(4-benzo[b]thienoxy) propionic acid (29.0 g., 0.1305 mole) in benzene (100 ml.) and thionyl chloride (48 g., 0.404 mole, 29 ml.) was stirred for 15 minutes and then refluxed for 1 hour. The dark reaction mixture was stripped of solvent and excess thionyl chloride under reduced pressure to give the residual crude acid chloride (33.4 g.).

IR: (~1790 cm.$^{-1}$, C=O)
NMR: ($CDCl_3$): σ 1.78 (3H, *d*, C—$CH_3$), 5.03 (1H, *q*, OCH), 6.54 (1H, *d*, vinyl H), 7.3 (4H, *m*, aromatic and S—C<u>H</u>=).

D. N,N-diethyl-2-(4-benzo[*b*]thienoxy)propionamide 2-(4-benzo[*b*]thienoxy)propionyl chloride (6.5 g., 0.027 mole) was dissolved in 100 ml. of benzene. To this stirred solution was added a benzene solution of diethylamine (4.38 g., 0.06 mole, 6.2 ml.) in about 15 minutes. The temperature rose to a maximum of 48° C. as white solids appeared in the reaction mixture. After a reflux period of one hour, the mixture was cooled and the solids removed by filtration. The filtrate was washed consecutively with 10% HCl solution, saturated $NaHCO_3$ solution, and water. The organic phase after drying with anhydrous $MgSO_4$ was stripped under reduced pressure to yield a residual oil which later crystallized to a solid. Recrystallization gave the product as a white granular solid (6.8 g.) with a melting point of 65–67° C.

IR: (1625 cm.$^{-1}$, C=O)
NMR: ($CDCl_3$) σ 1.05 (6H, *m*, C—$CH_3$), 1.65 (3H, *d*, O—C—$CH_3$), 3.33 (4H, *m*, $NCH_2$), 5.03 (1H, *q*, OCH), 6.67 (1H, *d*, vinyl H), 7.28 (4H, *m*, aromatic and S—C<u>H</u>=).

EXAMPLE 2

N,N-di-*n*-propyl-2-(4-benzo[*b*]thienoxy)propionamide

Di-*n*-propylamine (5.07 g., 0.05 mole, 6.87 ml.) in an equal volume of benzene was added dropwise to a stirred solution of 2-(4-benzo[*b*]thienoxy)propionyl chloride (5.0 g., 0.0208 mole) in 100 ml. of benzene. A slight exotherm was noted as solids (di-*n*-propylamine hydrochloride salts) formed. The reaction mixture was refluxed for about ½ hour, cooled and the salts removed by filtration. Washing the filtrate, drying, and solvent removal as described previously gave 5.5 g. of oil which later crystallized to a solid. Recrystallization from ethanol-water gave the product as an off-white solid with a melting point of 69–71° C.

IR: (1640 cm.$^{-1}$, C=O)
NMR: ($CDCl_3$) σ 0.83 (6H, *m*, C—$CH_3$), 1.55 (*m*) with a superimposed *d* at 1.68 (total 7H, O—C—$CH_3$ and N—C—C<u>H</u>$_2$—C), 3.3 (4H, *m*, $NCH_2$), 5.1 (1H, *q*, OCH), 6.72 (1H *d*, vinyl H), 7.3 (4H, *m* aromatic and S—C<u>H</u>=).

EXAMPLE 3

N-*n*-propyl-2-(4-benzo[*b*]thienoxy)propionamide

According to the procedure in Example 2, *n*-propylamine (2.96 g., 0.05 mole, 4.12 ml.) was reacted with 2-(4-benzo[*b*]thienoxy)-propionyl chloride (5.0 g., 0.0208 mole) to give a solid, which after crystallization from ethanol-water give 4.6 g. of product with a melting point of 88–90° C.

IR: (1630 cm.$^{-1}$, C=O)

NMR ($CDCl_3$) σ 0.86 (3H, *t* C—$CH_3$), 1.55 (*m*) with superimposed *d* at 1.67 (total 5H, O—C—$CH_3$ and N—C—C$\underline{H}_2$—C), 3.23 (2H, *q*, $NCH_2$), 4.8 (1H, *q*, OCH), 6.5 (1H, broad, NH), 6.69 (1H, *d*, vinyl H), 7.3 (4H, *m* aromatic and S—C$\underline{H}$=).

EXAMPLE 4

N,N-dimethyl-2-(4-benzo[*b*]thienoxy)propionamide 2-(4-benzo[*b*]thienoxy)propionyl chloride (6.0 g., 0.0249 mole) was dissolved in 200 ml. of diethyl ether. An excess of gaseous dimethylamine was added through a sintered glass tube with the temperature of the reaction mixture maintained at 5 to 10° C. Copious white solids formed and a warm water bath was applied to remove excess dimethylamine. The solids (about 2.3 g. of amine salt) were removed by filtration, and after benzene was added to the filtrate containing the product, the usual work-up procedure gave white solids (4.5 g.) which without further purification melted at 128–32° C.

IR: (1635) cm.$^{-1}$, C=O)

NMR: $CDCl_3$) σ 1.62 (3H, *d*, O—C—$CH_3$), 2.9 (6H, *d*, $NCH_3$), 5.02 (1H, *q*, OCH), 6.59 (1H, *d*, vinyl H), 7.23 (4H, *m*, aromatic and S—C$\underline{H}$=).

EXAMPLE 5

N-methyl-2-(4-benzo[*b*]thienoxy)propionamide

According to the procedure of Example 4, gaseous monomethylamine was reacted with 2-(4-benzo[*b*]thienoxy)propionyl chloride (5.0 g., 0.0208 mole) to give 4.6 g. of crude white product with a melting point of 114–16° C.

IR: (1640 cm.$^{-1}$, C=O)

NMR: ($CDCl_3$) σ 1.58 (3H, *d*, O—C—$CH_3$), 2.75 (3H, *d*, $NCH_3$), 4.71 (1H, *q*, OCH), 6.5 (2H, broad with superimposed *d*, NH and vinyl H), 7.2 (4H, *m*, aromatic, S—C$\underline{H}$=).

EXAMPLE 6

2-(4-benzo[*b*]thienoxy)propionamide

According to the procedure of Example 4, aqueous ammonia was reacted with 2-(4-benzo[*b*]thienoxy)propionyl chloride (6.0 g., 0.0249 mole) to give 5.6 g. of product which upon recrystallization from ethanol-water yielded 3.5 g. solids, with a melting point of 166.5–68° C.

IR: (1630 cm.$^{-1}$, C=O)

NMR: ($d_6$DMSO): σ 1.83 (3H, *d*, O—C—$CH_3$), 5.07 (1H, *q*, OCH), 7.04 (1H, *d*, vinyl H), 7.4–8.0 (6H, *m*, aromatic, S—C$\underline{H}$=, and $NH_2$).

EXAMPLE 7

Methyl-(4-benzo[*b*]thienoxy)acetate

This compound was prepared utilizing the method of Example 1–A. 4-hydroxybenzo[*b*]thiophene (30.0 g., 0.20 mole) was reacted with sodium methoxide (11.6 g., 0.215 mole) and then ethyl bromoacetate (36.0 g., 0.215 mole) in absolute methanol. The crude ester product (40.2 g.) was isolated as an oil.

IR: (1740 cm.$^{-1}$, C=O)

EXAMPLE 8

(4-benzo[*b*]thienoxy)acetic acid

Saponification of methyl-(4-benzo[*b*]thienoxy)acetate 37.0 g., 0.166 mole) with sodium hydroxide (7.0 g., 0.175 mole) in aqueous alcohol according to the procedure described in Example 1–B gave 30.8 g. of product acid as a white solid.

NMR: ($d_6$DMSO) σ 5.18 (2H, *s*, $CH_2$), 7.09 (1H, *d*, vinyl H), 7.75 (4H, *m*, aromatic and S—C$\underline{H}$=), hydroxyl H exchanged with solvent.

EXAMPLE 9

(4-benzo[*b*]thienoxy)acetyl chloride

A solution of (4-benzo[*b*]thienoxy)acetic acid (27.4 g., 0.1314 mole) in 100 ml. of benzene and excess thionyl chloride (47.6 g., 0.40 mole, 28.7 ml.) was refluxed for 1½ hours. The crude acid chloride (30.8 g.) was isolated as a pungent oil by removal of solvent and excess thionyl chloride under reduced pressure.

IR: (1780 cm.$^{-1}$, C=O)

EXAMPLE 10

N,N-dimethyl-(4-benzo[*b*]thienoxy)acetamide

Excess dimethylamine was reacted with (4-benzo[*b*]thienoxy)acetyl chloride (6.0 g., 0.0265 mole) in the usual manner to give 5.1 g. of crude pale yellow solids with a melting point of 81–6° C.

NMR: ($CDCl_3$) σ 2.95 (6H, *d*, $NCH_3$), 4.74 (2H, *s*, $CH_2$), 6.7 (1H, *d*, vinyl H) 7.3 (4H, *m*, aromatic and S—C$\underline{H}$=).

EXAMPLE 11

N,N-diethyl-(4-benzo[*b*]thienoxy)acetamide

Diethylamine (4.46 g., 0.061 mole, 6.27 ml.) was reacted with (4-benzo[*b*]thienoxy)acetyl chloride (6.0 g., 0.0265 mole) in anhydrous ether to give 6.5 g. of viscous oil as the product.

IR: (1640 cm.$^{-1}$, C=O)

NMR: ($CDCl_3$) σ 0.6 (6H, *t*, C—$CH_3$), 3.3 (4H, *m* N—$CH_2$), 4.71 (2H, *s*, $CH_2$), 6.68 (1H, *d*, vinyl H), 7.3 4H, *m* aromatic and S—C$\underline{H}$=).

EXAMPLE 12

N,N-di-*n*-propyl-(4-benzo[*b*]thienoxy)acetamide

Di-*n*-propylamine (6.17 g., 0.061 mole, 8.36 ml.) was reacted with (4-benzo[*b*]thienoxy)acetyl chloride (6.0 g., 0.0265 mole) to give 7.0 g. of oil which upon trituration with cold petroleum ether crystallized to a white solid (6.2 g.) with a melting point of 66.5–70° C.

IR: (1640 cm.$^{-1}$, C=O)

NMR: ($CDCl_3$) σ 0.87 (6H, *t*, C—$CH_3$), 1.57 (4H, *m*, C—C$\underline{H}_2$—C), 3.24 (4H, *t*, $NCH_2$) 4.79 (2H, *s*, $CH_2$), 6.72 (1H, *d*, vinyl H), 7.3 (4H, *m*, aromatic and S—C$\underline{H}$=).

EXAMPLE 13

(4-benzo[*b*]thienoxy)acetamide

Gaseous ammonia was reacted with (4-benzo[*b*]-thienoxy) acetyl chloride (6.0 g., 0.0265 mole) in ether to give copious solids which were directly recrystallized from ethanol-water. The product (4.3 g.) was a white solid with a melting point of 158–60° C.

NMR: ($d_6$DMSO) σ 4.88 (2H, *s*, $CH_2$), 7.08 (1H, *d*, vinyl H), 7.8 (6H, *m*, aromatic, S—C$\underline{H}$=, and $NH_2$).

In illustration of this invention, several embodiments of the compounds of this invention were subjected to tests for herbicidal activity as described hereinafter with the test results being set forth in the table following the test description.

HERBICIDE TESTING METHODS

The test species propagated for testing are:

| | |
|---|---|
| Crabgrass | Cotton |
| Johnson grass | Bean |
| Barnyard grass | Corn |
| Turnip | |

Each specie is planted individually in 3" plastic pots containing potting soil. Four seeds each of the bean, corn and cotton are seeded to a depth equal to the diameter of the seed. The other species are surface seeded and sprinkled with screened soil in an amount sufficient to cover the seed. Immediately after planting, all pots are watered by sub-irrigation in greenhouse trays. Pots for the pre-emergence phase of testing are seeded one day before treatment.

Planting dates for the post-emergence phase of testing are varied so that all seedlings will reach the desired stage of development simultaneously. The proper stage of development for treatment in the post-emergence tests is as follows:

Grasses: 2 inches in height
Turnip: 1 or 2 true leaves visible above cotyledons
Cotton: first true leaf 1 inch in length; expanded cotyledons
Corn: 3 to 4 inches in height
Bean: primary leaves expanded, growing point at primary leaf node.

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at rates of application equivalent to 10, 4, 2 and 1 pounds actual/acre in a spray volume of 38 gal./acre. Spray hood constants required to deliver the above volume are as follows:

Belt Speed: 2 m.p.h.
Air Pressure: adjusted to provide 38 g.p.a. delivery
Nozzle Tip: 8003E (provides uniform cross-section flat spray)

Formulations for spray applications (as used in the compositions for which data are set forth in the Table hereinafter) are prepared in 50 ml. volumes with the following components:

Ten Pounds Per Acre Rate
1. 1.55 grams active compound
2. 49 ml. acetone as solvent
3. 1 ml. xylene-Atlox 3414 (surface-active emulsifier)

Four Pounds Per Acre Rate
1. 0.62 grams active compound
2. 49 ml. acetone as solvent
3. 1 ml. xylene-Atlox 3414

Two Pounds Per Acre Rate
1. 0.31 grams active compound
2. 49 ml. acetone as solvent
3. 1 ml. xylene-Atlox 3414

One Pound Per Acre Rate
1. 0.155 grams active compound
2. 49 ml. acetone as solvent
3. 1 ml. xylene-Atlox 3414

Two weeks after treatment, a pre- and post-emergence injury or control is visually rated as percent injury or control (percent effectiveness).

TABLE.—HERBICIDAL ACTIVITY (PERCENT EFFECTIVENESS) OF THE COMPOUNDS OF THE PRESENT INVENTION

| Example compound | Application concentration, lbs /acre | Crabgrass | Johnson grass | Barnyard grass | Turnip | Cotton | Bean | Corn |
|---|---|---|---|---|---|---|---|---|
| | | Pre-emergence activity | | | | | | |
| 1A | 1 | 0 | | 0 | 80 | | | |
| 1B | 10 | 20 | | 30 | 100 | | | |
| 1D | 10 | 100 | 90 | | 0 | | | |
| | 4 | 100 | 90 | 90 | 20 | | | |
| | 2 | 100 | | 90 | 0 | 50 | 30 | 30 |
| 2 | 4 | 90 | | 80 | 40 | | | |
| 3 | 10 | 80 | | 40 | 0 | | | |
| | | Post-emergence activity | | | | | | |
| 1A | 1 | 30 | 20 | 20 | 70 | | | |
| 1B | 10 | 20 | | 30 | 70 | | | |
| 1D | 10 | 90 | | | 50 | 50 | 90 | |
| | 4 | 40 | 30 | 40 | 40 | | | |
| 2 | 4 | 40 | | 40 | 60 | | | |
| 3 | 10 | 30 | | | 30 | | | |

From the data in this Table, it will be noted that the compounds of this invention have abroad range of both pre- and post-emergence herbicidal activity. The specific embodiments of these compounds used for testing show effectiveness against Crabgrass and Barnyard grass, annual grass weeds which reproduce by seeds and are problems in lawns and field crops. They also prove effective against Johnson grass, a perennial grass weed which reproduces by seed and underground rhizomes and is primarily a problem in field crops.

The compounds of this invention exhibit considerable pre- and post-emergence herbicidal activity and are disclosed for use in various ways to achieve pre-emergence or post-emergence contact control of undesirable herbs. They can be applied as the toxic components in herbicidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the herbicidal compositions. Non-limiting examples of liquid carriers include water, organic oils such as kerosene, light oils and medium oils, and vegetable oils such as cottonseed oil. Non-limiting examples of solid carriers include talc, bentonite, diatomaceous earth, pyrophyllite, fullers earth, gypsum, flours derived from cotton seeds, and nut shells and various natural and synthetic clays having a pH not exceeding about 9.5.

The amount of the compounds of this invention utilized in herbicidal compositions will vary rather widely. It depends to some extent upon the type of composition in which the material is being used, the nature of the condition to be controlled, and the method of application (i.e., spraying, dusting, etc.). In the ultimate herbicidal compositions, as applied in the field, herbicide concentrations as low as 0.0001 weight percent of the total composition can be used. In general, compositions, as applied, containing about 0.05 weight percent herbicide in either liquid or solid carrier gave excellent results. In some cases, however, stronger dosages up to about 10 weight percent may be required.

In practice, herbicidal compositions are usually prepared in the form of concentrates, which are diluted in the field to the concentration desired for application. For example, the concentrate can be a wettable powder containing large amounts of a compound of this invention, a carrier (e.g., attapulgite or other clay) and wetting and dispersing agents. Such a powder can be diluted prior to application, by dispersing it in water to obtain a sprayable suspension containing the concentration of herbicide desired for application. Other concentrates can be solutions that can be later diluted, e.g., with kerosene. Thus, it is within the contemplation of this invention to provide herbicidal compositions containing up to about 80 percent, by weight of the composition, of a herbicidal compound of this invention. Accordingly, depending upon whether it is ready for application or it is in concentrated form, the contemplated herbicidal compositions contain between about 0.0001 percent and about 80 percent, by weight of the composition, of a herbicidal compound of this invention, and a carrier, liquid or solid, as defined hereinbefore.

Although the present invention has been described with preferred embodiments, it is to be understood that modifications and variations may be resorted to without departing from the spirit and scope of this invention, as those skilled in the art will readily understand.

What is claimed is:

1. A compound having the following structural formula:

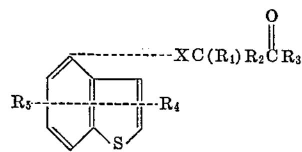

wherein X is a member selected from the group consisting of oxygen and sulfur, $R_1$ is a member selected from the group consisting of hydrogen and alkyl of 1–5 carbon atoms, $R_2$ is a member selected from the group consisting of hydrogen, alkyl of 1–3 carbon atoms, $R_3$ is a member selected from the group consisting of hydroxy, alkoxy of 1–5 carbon atoms, halogen, $NR_6R_7$, $R_4$ and $R_5$ are members selected from the group consisting of hydrogen and alkyl of 1–5 carbon atoms and $R_6$ and $R_7$ may be selected from the group consisting of hydrogen and alkyl of 1–5 carbon atoms.

2. A compound as defined in Claim 1, wherein X is oxygen, $R_1$ is alkyl of 1–5 carbon atoms or hydrogen, $R_2$ is hydrogen, $R_3$ is selected from the group consisting of hydroxy, alkoxy of 1–5 carbon atoms and $NR_6R_7$, and $R_4$ and $R_5$ are hydrogen, and wherein $R_6$ and $R_7$ are alkyl of 1–5 carbon atoms or hydrogen.

3. The compound of Claim 2, wherein $R_1$ is hydrogen and $R_3$ is methoxy.

4. The compound of Claim 2, wherein $R_1$ is hydrogen and $R_3$ is hydroxy.

5. The compound of Claim 2, wherein $R_1$ is hydrogen and $R_3$ is halogen.

6. N,N-diethyl-2-(4-benzo[*b*]thienoxy) propionamide.

7. N,N-di-*n*-propyl-2-(4-benzo[*b*]thienoxy) propionamide.

8. N-*n*-propyl-2-(4-benzo[*b*]thienoxy) propionamide.

9. N,N-dimethyl-2-(4-benzo[*b*]thienoxy) propionamide.

10. N-methyl-2-(4-benzo[*b*]thienoxy) propionamide.

11. 2-(4-benzo[*b*]thienoxy) propionamide.

12. N,N-dimethyl-(4-benzo[b]thienoxy) acetamide.

13. N,N-diethyl-(4-benzo[*b*]thienoxy) acetamide.

14. N,N-*n*-propyl-(4-benzo[*b*]thienoxy) acetamide.

15. (4-benzo[*b*]thienoxy) acetamide.

16. Methyl-2-(4-benzo[*b*]thienoxy) propionate.

17. 2-(4-benzo[*b*]thienoxy) propionic acid.

References Cited

UNITED STATES PATENTS

| | | | |
|---|---|---|---|
| 2,645,572 | 7/1953 | Blicke | 260—330.5 |
| 3,480,671 | 11/1969 | Tilles et al. | 260—559 B |
| 3,636,050 | 1/1972 | Driscoll et al. | 260—330.5 |
| 3,288,808 | 11/1966 | Kilsheimer et al. | 260—330.5 |

FOREIGN PATENTS

| | | | |
|---|---|---|---|
| 416,206 | 1/1967 | Switzerland | 260—330.5 |

OTHER REFERENCES

Cagniant et al.: "Bull. Soc. Chim., France," 1969, No. 2, February, pages 596–600.

HENRY J. JILES, Primary Examiner

R. T. BOND, Assistant Examiner

U.S. Cl. X.R.

260—239 E, 293.68, 241.1, 326.82; 71—90, 91